United States Patent [19]

Henry

[11] 4,141,964

[45] Feb. 27, 1979

[54] PROCESS FOR STRIPPING PHYSIOLOGICAL MATRICES FROM CELLS

[76] Inventor: Donald E. Henry, Cambridge, Mass.

[21] Appl. No.: 787,927

[22] Filed: Apr. 15, 1977

Related U.S. Application Data

[62] Division of Ser. No. 373,967, Jun. 27, 1973, abandoned.

[51] Int. Cl.[2] .......................... G01N 1/00; G01N 1/14

[52] U.S. Cl. .......................................... 424/3; 195/1.8

[58] Field of Search .............................. 195/1.8; 424/3

[56] References Cited

U.S. PATENT DOCUMENTS 2,928,614 3/1960 Emanuel et al. ....................... 241/39

OTHER PUBLICATIONS

Cameron - Tissue Culture Technique - Second Edit - (1950), p. 57.

*Primary Examiner*—Sam Rosen

*Attorney, Agent, or Firm*—Andrew F. Kehoe; Robert A. Cesari; John F. McKenna

[57] ABSTRACT

Process and apparatus for conditioning whole-cell-containing physiological specimens such as those comprising mucous as a thickening agent. The specimen is made homogeneous, i.e. transformed into a single-cell suspension, and reduced markedly in viscosity by repeatedly being forced or sucked into and out of a small and relatively sharp-edged conduit positioned in a sample-holding container.

13 Claims, 1 Drawing Figure

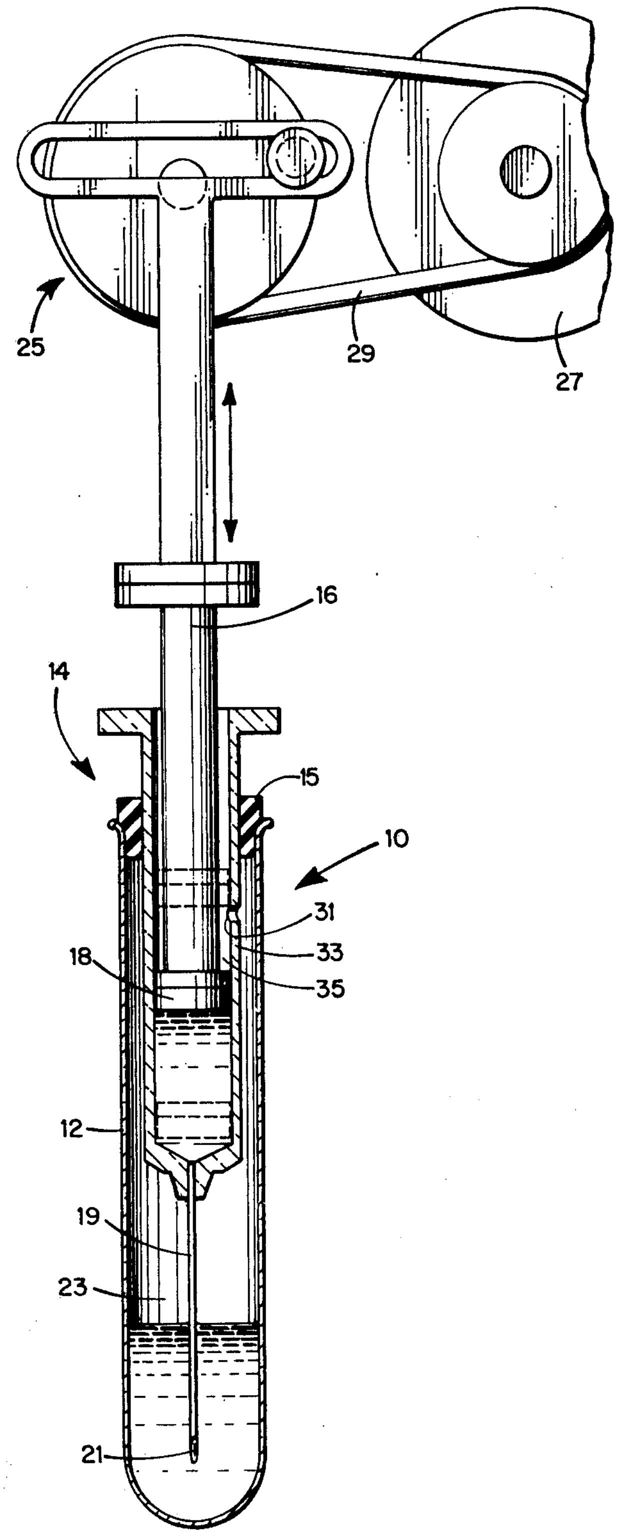
25
29
27
16
14
15
10
31
33
18
35
12
19
23
21

PROCESS FOR STRIPPING PHYSIOLOGICAL MATRICES FROM CELLS

This is a division of application Ser. No. 373,967 filed June 27, 1973, now abandoned.

BACKGROUND OF THE INVENTION

Many physiological samples contain cellular materials which are advantageously studied, in the investigation for disease or for some other purpose, under the microscope or by sedimentation-rate testing apparatus or the like. To facilitate such study, it is often necessary to mechanically break down the physiological specimen to reduce its viscosity or to disperse its cells forming what is known in the art as a single-cell suspension. Some such specimens are readily dispersed by short-term shaking. However, other specimens, e.g. mucous-containing specimens such as sputum and nasal specimens, require a more severe treatment to achieve a dispersion of the cells suitable to facilitate testing. This fact has markedly interfered with the widespread use of tests for detecting disease by testing such samples.

For example, it has been known for quite some time that the analysis of sputum is a quick and easy way for mass screening for lung cancer. However, handling sputum in the laboratory presents considerable problems because of the rather thick, viscous nature of the material. This stringy, thick consistency is due to the presence of mucous. Heretofore a number of procedures have been used in an attempt to condition these samples. One of these is use of a simple shearing technique, e.g. depositing sputum on one glass slide and smearing it with another. This has been totally unsatisfactory as have been such other shearing techniques, e.g. using a mortar and pestle, etc. Mucolytic agents have been used to break down the mucous but this approach is also unsatisfactory, because it tends to destroy some of the cells that one wishes to preserve for analysis. The Waring Blendor approach has been used by because of (a) centrifugal force causing part of the sample to avoid shear; (b) an excessively-localized shear action which tends to destroy some of the cells; and (c) air currents which can disseminate dangerous cells, the approach has been less than satisfactory. Use of ultrasonic dispersing techniques also destroys cells. Nothing in this paragraph is meant to be construed as necessarily illustrating "prior art" in the statutory sense. The various processes disclosed herein are among those which have been tried or have come to the attention of the applicant.

Similar problems exist in preparing samples in which cells are immobilized in tissue or other physiological matrices.

SUMMARY OF THE INVENTION

Therefore it is a principal object of this invention to provide improved apparatus for facilitating the preparation for analysis of agglomerate physiological specimens by breaking the agglomerated specimen down into a highly fluid dispersion of cells, i.e. single-cell dispersions.

Another object of the invention is to provide a process for making such a fluid dispersion of cells under sterile conditions but with a minimum of damage to the cells.

A further object of the invention is to provide apparatus which is inexpensive, easily cleanable, provides a minimum surface for contacting the cells and an easily controlled work input into the cellular sample being processed.

Other objects of the invention will be apparent to those skilled in the art on reading the instant application.

The above objects have been achieved by the development of a process wherein a specimen to be conditioned is placed in an enclosed chamber, say a test tube, usually with a quantity of dispersing medium, and then subjected to a shear stress by repeatedly being drawn into and expelled through an orifice, preferably into a conduit with a relatively sharp-edged orifice at the entrance thereto. One example of such a conduit would be a common surgical needle of, say, 20-gauge. The needle can be positioned for use in any suitable device, e.g. a conventional hypodermic needle. A typical operating rate would be eight 2.5-inch intake strokes of the plunger per minute. When a quantity of about 1 cc. of a typical sputum sample and a quantity of about 8 cc. of ethanol as a dispersing medium is so processed in a 40-ml. test tube, a completely flowable fluid exhibiting an excellent single-cell dispersion can be prepared within about 5 to 10 minutes.

The process will generally be operated on a liquid suspension below about 100° F.

The process totally avoids all problems associated with prior art dispersing techniques. There is no air circulation about the sample that could result in dispersal of disease-bearing cells into the environment; any substantial destruction of cells is avoided; the amount of work done on material in a given sample is minimized and, as important, the distribution of stress applied throughout the sample is uniform; and the sample-to-sample variation in the sample conditioning process may be minimized.

The whole-cell-bearing physiological samples most advantageously treated by the process are those in which a substantial number of cells are contained in a physiological matrix material. By "physiological matrix material" is meant matter such as mucous or other tissue which holds cellular material embedded therein so that the cells are not freely mobile in relation to one another as they would be were they dispersed in a fluid, say an aqueous, medium.

It has been found that the invention is most advantageously practiced by adding a small quantity of a sterile, liquid dispersing medium to the sample before the stressing action is started. This liquid not only provides a sterile medium, but also aids in dissipating the cohesive nature of the matrix material, and thereby reduces the viscosity of the system and helps maintain the cells in suspension.

The size of the conduit is not critical except that the size should not be so small as to permit blockage by sample debris or interfere with passage of larger cells. In practice, surgical needles of from 18- to 26-gauge are entirely suitable. Inside diameter of such tubing is, typically, about 0.005 inches to 0.1 inches (5 to 100 mils). The use of a needle with its sharpened edge is advantageous because it plays a role in increasing the amount of effective mucous or tissue surface area which can be chemically attacked by the dispersing agent. However, the use of the needle is not absolutely necessary to obtain most of the advantages of the invention.

The size of cells which are to be inspected will range from about 5 to 100 microns, depending on the kind of sample that is to be treated.

When a surgical needle is used, the average intake velocity of material past the shearing orifice of the apparatus will usually be from 1 to 100 feet per minute although it will be understood that some samples may require a more gentle processing and others will tolerate greater speeds.

A particularly advantageous means of operation a syringe-type apparatus according to the invention is to provide means to assure release of any vacuum in the liquid conduit portion of the syringe at the end of the suction stroke and before the compression stroke. This is conveniently accomplished by providing a relief hole in the syringe wall positioned so that the hole will only be exposed to the sample-processing side of the plunger at the end of the suction stroke. The advantage of this is that, when air is admitted to break the suction, this air is also made available to provide a fluid or pneumatic cushion above the cell-bearing sample which aids markedly in reducing or avoiding sample adhering to the conduit wall on the compression, or sample-ejecting, stroke.

Moreover, this presence of air allows a greater pressure to be built up within the conduit and, consequently, an increased pressure differential across the nozzle, or orifice, as the sample is ejected therethrough. The mechanical effect of this pressure drop aids in the breakdown of the physiological matrix, complementing the shearing action of the orifice edge during the intake stroke and facilitating chemical attack by the dispersing agent on the physiological matrix.

Particularly useful dispersing agents are those which act as cell preservatives and have a tendency to plasticize, or soften, or dissolve the physiological matrix material. Trichloroacetic acid is particularly useful in aiding the breakdown of such a matrix, especially mucous wherein it may reduce the time required to obtain a suitable single-cell suspension by a factor of three or more. A 6% aqueous solution of trichloroacetic acid is useful. Halogen-bearing, organic preservatives are preferred as dispersing media because they apparently assist in an advantageous chemical attack on the mucous. Ethyl alcohol, although useful, tends to toughen the mucous and prolong the process. Acetic acid is an example of a well-known cell preservative, but is not generally desirable for use because it has no substantial solubilizing effect. Indeed, it is used as a reagent in mucous-precipitation processes.

ILLUSTRATIVE EXAMPLE OF THE INVENTION

In this application and accompanying drawing there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWING

The drawing is an elevation and schematic illustration of apparatus of the invention utilizing a hypodermic needle as a decongesting conduit means.

Referring to the drawing, it is seen that sample-conditioning apparatus 10 comprises a glass tube 12 in which is positioned, by member 15, a syringe 14 comprising a handle 16 and plunger 18 of the type ordinarily used with hypodermic needles for injecting medicine, drawing blood samples, etc. A 20-gauge surgical needle 19 of stainless steel depends from syringe 14 into the compartment 23 formed by the lower portion of tube 12. Operating handle 16 of the syringe is adapted for reciprocal motion by attachment to an eccentric drive wheel 25. Drive wheel 25 is driven at about 10 rpm by motor 27 and transmission belt 29.

In operation, a sample of mucous-immobilized sputum having a gel-like consistency is placed in compartment 23. Next a quantity of sterile dispersion medium is added to the compartment. Typically the volume of dispersing agent will be approximately eight times the volume of the sample of sputum. The motor is turned on and plunger 18 is caused to reciprocate through about 10 cycles per minute. Each cycle, of course, causes a quantity of the contents of compartment 23 to be carried into and ejected from the orifice 21 of the needle.

It will be noted there is an aperture 31 in wall 33 of syringe 14. This aperture is so positioned that, upon completion of the upward stroke of plunger 18, air is admitted to syringe cylinder 35. This admission of air breaks the suction caused on the upward stroke of the syringe, allows some air to enter cylinder 35, and, in general, has been found to aid both the physical breakdown of the physiological matrix and the minimizing of sample hang up on the interior wall of the syringe and needle.

After about 5 minutes of such processing, the contents of compartment 23 are in the form of a relatively homogeneous dispersion of a generally watery consistency. The dispersion is entirely satisfactory for use in preparing microscopic slides for study of the whole cells contained in the suspension.

It is also to be understood that the following claims are intended to cover all of the generic and specific features of the invention herein described, and all statements of the scope of the invention which, as a matter of language, might be said to fall therebetween.

What is claimed is:

1. A process for forming a suspension of single cells with minimal damage to said cells from a sample of physiological substance in which said cells are held relatively immobile by a physiological matrix material, the steps comprising
   (a) placing the sample in a compartment with a dispersion medium; and
   (b) causing the sample to be repeatedly forced into and out of said compartment through an orifice until the desired dispersion is achieved.

2. A process as defined in claim 1 wherein said orifice is the opening to a conduit and has a cutting edge therearound.

3. A process as defined in claim 1 wherein portions of the sample are repeatedly drawn into and expelled from a needle-like conduit which is positioned in said compartment.

4. A process as defined in claim 1 wherein suction is utilized in forcing said sample through said orifice in one direction and wherein air is admitted to break said suction before compressing said sample for expulsion from said orifice in the other of said directions.

5. A process as defined in claim 1 wherein said dispersing medium comprises a halogenated organic cell preservative.

6. A process as defined in claim 1 wherein said dispersing medium is a solution of trichloroacetic acid.

7. A process as defined in claim 2 wherein portions of the sample are repeatedly drawn into and expelled from a needle-like conduit which is positioned in said compartment.

8. A process as defined in claim 1 wherein said orifice is from about 0.005 to about 0.1 inches in average diameter.

9. A process as defined in claim 1 wherein said physiological matrix material consists largely of mucous.

10. A process as defined in claim 2 wherein the average linear velocity of the substance through the orifice is from about 1 to 100 feet per minute.

11. A process for forming a single cell dispersion from a physiological specimen wherein cells are held in relatively immobile position within a physiological matrix material, said process consisting essentially of adding a liquid dispersing medium to said specimen and then repeatedly passing said specimen through an orifice until a fluid single cell dispersion is achieved.

12. A process as defined in claim 11 wherein said dispersing agent comprises a halogenated organic cell preservative.

13. A process as defined in claim 11 wherein said dispersing agent is a solution of trichloroacetic acid.

* * * * *